United States Patent [19]

Dial

[11] Patent Number: 5,537,211
[45] Date of Patent: Jul. 16, 1996

[54] METHOD AND APPARATUS FOR SELECTING A WEARABLE TO MATCH AN OBJECT

[75] Inventor: Oliver E. Dial, Emporia, Kans.

[73] Assignee: Triliance Corporation, Olathe, Kans.

[21] Appl. No.: 372,228

[22] Filed: Jan. 13, 1995

[51] Int. Cl.⁶ .................................................. G01J 3/46
[52] U.S. Cl. ............................................................ 356/402
[58] Field of Search ............................ 356/402–411, 421, 356/424

[56] References Cited

U.S. PATENT DOCUMENTS

| | | | |
|---|---|---|---|
| 3,596,390 | 8/1971 | Scalice | 40/365 |
| 3,809,785 | 5/1974 | Calabrese et al. | 35/28.3 |
| 3,918,812 | 11/1975 | Holm | 356/402 |
| 4,160,271 | 7/1979 | Grayson et al. | 364/400 |
| 4,232,334 | 11/1980 | Dyson | 358/93 |
| 4,351,591 | 9/1982 | Stockett | 353/25 |
| 4,403,963 | 9/1983 | Yoshida et al. | 434/100 |
| 4,434,467 | 2/1984 | Scott | 364/400 |
| 4,561,850 | 12/1985 | Fabbri et al. | 434/98 |
| 4,678,338 | 7/1987 | Kitta et al. | 356/402 |
| 4,773,761 | 9/1988 | Sugiyama | 356/405 |
| 4,838,697 | 6/1989 | Kurandt | 356/406 |
| 4,842,523 | 6/1989 | Bourdier et al. | 434/371 |
| 4,866,661 | 9/1989 | de Prins | 364/900 |
| 4,917,500 | 4/1990 | Lugos | 356/406 |
| 4,968,253 | 11/1990 | Thomas | 434/100 |
| 5,013,244 | 5/1991 | Davidson | 434/81 |
| 5,090,910 | 4/1992 | Narlo | 434/82 |
| 5,124,547 | 6/1992 | Melman | 250/226 |
| 5,128,708 | 7/1992 | Murayama et al. | 354/430 |
| 5,150,791 | 9/1992 | Kamen et al. | 206/457 |
| 5,157,465 | 10/1992 | Kronberg | 356/405 |
| 5,168,320 | 12/1992 | Lutz et al. | 356/73 |
| 5,172,146 | 12/1992 | Wooldridge | 354/21 |
| 5,178,169 | 1/1993 | Lamle | 132/319 |
| 5,229,841 | 7/1993 | Taranowski et al. | 356/406 |
| 5,236,365 | 8/1993 | Badami | 434/377 |
| 5,237,401 | 8/1993 | Koike et al. | 358/518 |
| 5,276,508 | 1/1994 | Boisvert et al. | 358/48 |
| 5,283,061 | 2/1994 | Kamen et al. | 424/400 |
| 5,296,945 | 3/1994 | Nishikawa et al. | 358/518 |
| 5,302,883 | 4/1994 | Hwang | 315/149 |
| 5,303,037 | 4/1994 | Taranowski | 356/402 |
| 5,311,293 | 5/1994 | MacFarlane et al. | 356/421 |
| 5,313,267 | 5/1994 | MacFarlane et al. | 356/405 |

*Primary Examiner*—Vincent P. McGraw
*Assistant Examiner*—K. P. Hantis
*Attorney, Agent, or Firm*—Reising, Ethington, Barnard & Perry

[57] ABSTRACT

A method and apparatus for selecting wearables, such as cosmetics and clothing accessories, which match an object of interest, includes control logic for selecting an appropriate wearable based on a metric determined by light reflected from the object. Light is transmitted by an input device which also detects the reflected light. The input device is connected to the control logic which determines a metric and compares the metric to predetermined data corresponding to each of the available wearables. The selected wearable is indicated to a customer by an output device also connected to the control logic. The output device may include a light corresponding to each available wearable, or a mechanical machine which provides the selected wearable or a sample of the selected wearable to the customer. In one embodiment the apparatus is utilized to match the color of a cosmetic foundation make-up to the color of the customer's skin.

34 Claims, 4 Drawing Sheets

METHOD AND APPARATUS FOR SELECTING A WEARABLE TO MATCH AN OBJECT

TECHNICAL FIELD

The invention pertains to the field of electronic devices utilized to select wearables, such as cosmetics and accessories, varying in color.

BACKGROUND ART

Previous devices for assistance in selecting cosmetics are generally characterized as shown in U.S. Pat. No. 4,232,334. A customer is exposed to a video camera which, in turn, has its output viewed by a beauty advisor. Based upon that independent review, a selection of appropriate cosmetics is displayed and a desired cosmetic is selected. Such a device is extraordinarily complicated requiring a video camera and the experience and judgment of an additional advisor.

U.S. Pat. No. 5,168,320 relates to a colorimeter for the measurement of transmitted, reflected, emitted and incident light. In a similar fashion, see U.S. Pat. Nos. 5,311,293 and 5,313,267. The patents in general relate to an instrument for selecting personal compatible colors. However, the devices are extremely complicated and in some respects have little or nothing to do with the cosmetic industry or pertain to the selection of a cosmetic that can be useful for manually matching skin color with the selected cosmetic color, such as from a database of selected cosmetics varying in color.

Other patents that relate in general to color selection and/or cosmetics are as follows: U.S. Pat. Nos. 3,596,390; 3,809,785; 4,160,271; 4,351,591; 4,403,963; 4,434,467; 4,561,850; 4,678,338; 4,838,697; 4,842,523; 4,917,500; 4,968,253; 5,013,244; 5,090,910; 5,124,547; 5,128,708; 5,150,791; 5,157,465; 5,172,146; 5,178,169; 5,229,841; 5,236,365; 5,237,401; 5,276,508; 5,283,061; 5,296,945; and 5,302,883.

None of the references describe a simple device that easily identifies a customer's color, complexion, hue, or pigmentation, and to assist the customer in selecting a color from a database of wearables which will match the skin color or another object of interest to the customer. In particular, none of the references suggest the above in the absence of an intermediate counselor.

SUMMARY OF THE INVENTION

Thus, it is an object of the present invention to describe a device and method for selecting a wearable based on the color of an object of interest utilizing an input device that observes the object of interest, a computing device having available selections of wearables that vary in color, a means to compare the object of interest with the colors of the wearables in the database, and an output device that can show the match to the customer.

It is another object of the present invention to have a device such as that described above which may be utilized at a point of sale.

It is still a further object of the present invention to assure customers that they are making the right choice based upon computerized color measurement, analysis, and selection.

Described is an apparatus for selecting a cosmetic based on the color of a customer's skin. The apparatus comprises: an input device that observes the skin color of a customer using a light source that emits light onto the customer's skin and a photosensor that measures the light from the light source reflected by the customer's skin; a computer containing a database of available cosmetic colors; means to transfer a representation of the customer's skin color, as determined by the input device, to the computer so that the computer can select a similar available cosmetic color from the database; and an output device connected to the computer that can show the customer the results of the color match performed by the computer.

A method is also described for selecting a cosmetic based on the color of a customer's skin comprising the steps of: a) observing a customer's skin color by an input device that emits light from a source onto a customer's skin and a photosensor that measures the light reflected by the customer's skin; b) transferring a representation of the skin color from the input device to a computer that has a database of available cosmetics that vary in color; c) selecting an available cosmetic similar in color to the skin color of the customer; and d) indicating the selected cosmetic to the customer utilizing an output device connected to the computer.

Also described is an apparatus for selecting a wearable comprising an input device having a light emitting portion and a light receiving portion. The light emitting portion is operative to emit light which is reflected by an object. The light receiving portion is operative to detect the reflected light. The apparatus also comprises control logic in communication with the input device including data representative of a plurality of wearables and being operative to select one of the plurality of wearables based on the detected reflected light. Finally, the apparatus includes an output device in communication with the control logic for indicating the selected wearable.

DESCRIPTION OF PREFERRED EMBODIMENTS

Figure 1:
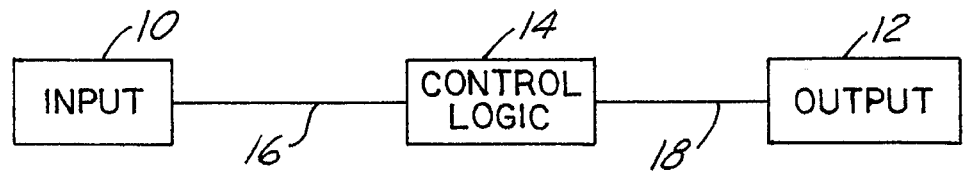
FIG. 1 is a block diagram of the apparatus of the present invention.

Cosmetics are important in our society. With the appropriate cosmetics, people will look good and feel good about themselves. The manufacture and sale of cosmetics is a large and growing business.

Facial cosmetics begin with foundation. While foundation color is sometimes chosen to be a darker shade for a more tanned appearance or, alternatively, a shade lighter than skin color, foundation color is most commonly chosen to match the skin in intensity and hue so that the boundary between natural skin and foundation will not be noticeable.

Selecting the correct foundation color can be difficult. Cosmetic lines can include anywhere from a few to more than fifty foundation colors, making the best choice confusing and difficult. Cosmetic counter personnel employed to assist in the selection possess varying degrees of skill. Customers are not trained in color matching and may even be color blind. Bathroom cabinets and dresser drawers stuffed with cosmetics tried and failed testify to the difficulty and cost of seeking the right cosmetic color. Consequently, customers tend to be extremely loyal to cosmetics they have used before and with which they have been satisfied. Customers can thus be confident that they are buying the right cosmetics to look and feel good.

Color measurement matching instruments are in common use in other industries. MacBeth manufactures an instrument to measure automotive paint colors. DataColor manufactures a device for matching paint colors in hardware paint stores. Allen-Bradley manufactures a color sensor to distinguish between parts of different color on an assembly line. Many manufacturers build colorimeters and spectro-photometers for various purposes. Color science and the CIE color matching function teach us how to analyze spectrophotometric data in terms of human, tri-stimulus perception. While color measurement and matching are well established art, none of the cited devices address the unique requirements for a cosmetics point of sale device.

It is another object of the invention to provide a cosmetics point of sale device which is small, inexpensive, accurate, easy to use, and most importantly, must provide a customer presentation which is consistent with the glamorous world of cosmetics and shields the customer from the high-tech workings of computers and sensors. Accordingly, the present invention uses color LEDs (light-emitting diodes) and a photosensor for a compact, inexpensive method of color measurement. Sensor design and computer analysis assure accurate results. Automatically taking measurements and displaying results when the sensor is touched to the skin makes the device easy to use. The result is displayed by lighting a light associated with the selected cosmetic. The lights could simply be located next to the name and a color sample of the indicated cosmetic, or they could spotlight a compartment from which bottles of the cosmetic could be dispensed. The customer thus sees a glamorous display and is not intimidated.

The device comprises three parts: the sensor, the output device (or display), and the computer. The sensor measures the diffuse reflectivity of the skin at various nominal wavelengths. The display in a preferred embodiment has a light for each cosmetic. The computer analyzes the sensor data, determines which cosmetic is the best match, and turns on the associated light on the display indicating the selected cosmetic. Each of these parts will be described in greater detail below. Of course, more conventional output devices could be utilized with the present invention, such as a computer display, a printer (to print the selected wearable), a liquid-crystal display (LCD), or the like.

Figure 2:
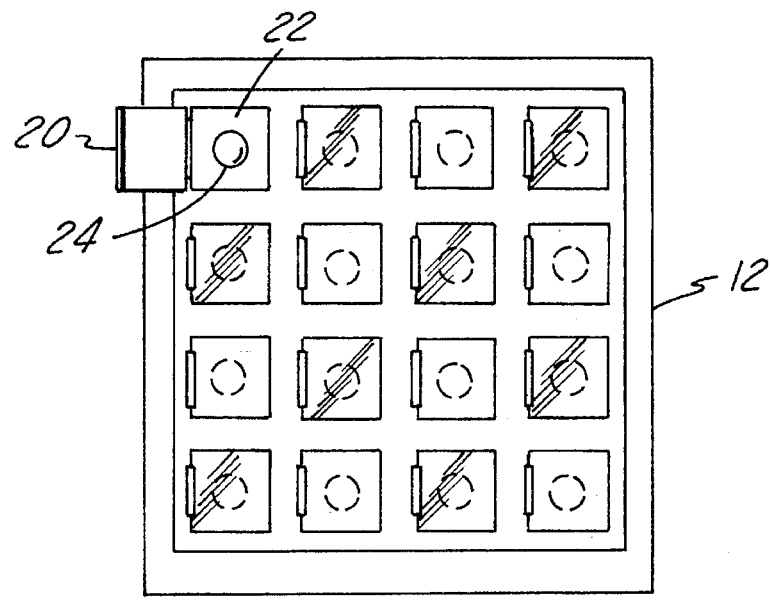
FIG. 2 is a schematic display of an output device which may be utilized with the present invention.

As shown in FIGS. 1 and 2, the device comprises a sensor 10, an output device 12, and control logic 14, such as a computer, or the like. Electrical cable 16 contains a number of wires connecting sensor 10 to control logic 14. A second electrical cable 18 connects control logic 14 to output device 12. Sensor 10 measures the diffuse reflectivity of a customer's skin at various wavelengths. The output device 12 has one door 20 for each cosmetic color compartment 22. The control logic 14 analyzes the sensor data, determines which cosmetic is the best match, and opens an associated door 20 indicating that cosmetic color compartment 22 has been selected. Alternatively, or in addition to opening a door 20, a light 24 may be lit to indicate the selected item. Light 24 may be an incandescent bulb, an LED, or the like.

Figure 3:
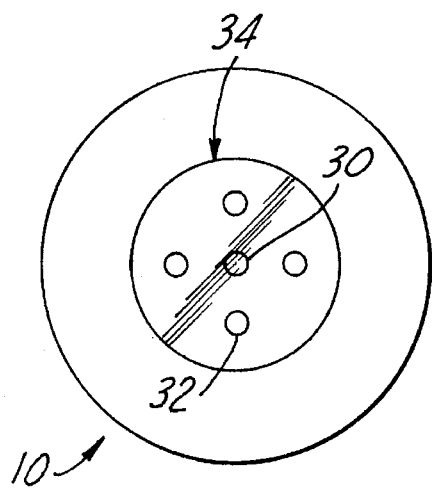
FIG. 3 is a plan view of the color sensor utilized in the apparatus of the present invention.

A compact, inexpensive color sensor can be built using appropriately selected LEDs and a photosensor such as that shown in the plan view of FIG. 3. The sensor 10 comprises a photosensor 30, a number of LEDs 32, and an optic window 34. The photosensor 30 can be a sensitive photo-darlington such as the Sharp PT361. Preferably, the LEDs are selected from a variety of commercially available LEDs having different nominal emission wavelengths such as red (Panasonic LN81RCPHL), yellow (Panasonic LN41YCPHL), green (Panasonic LN31GCPHL), and blue (Cree C470-5C18). The optic window 34 protects the LEDs 32 and the photosensor 30 from dirt and contamination while allowing light from the LEDs 32 to pass out to the object of interest and for the reflected light to pass back to the photosensor 30.

Figure 4:
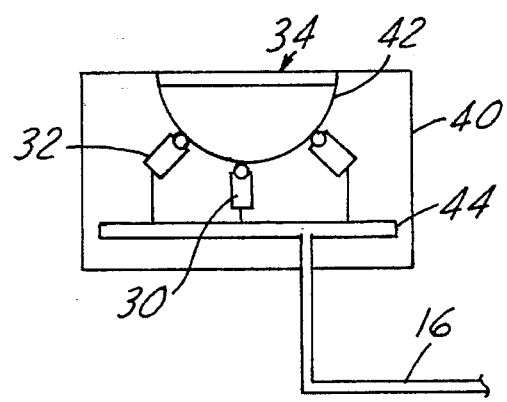
FIG. 4 is a cross-section of the color sensor illustrated in FIG. 3 utilized in the present invention.
Figure 5:
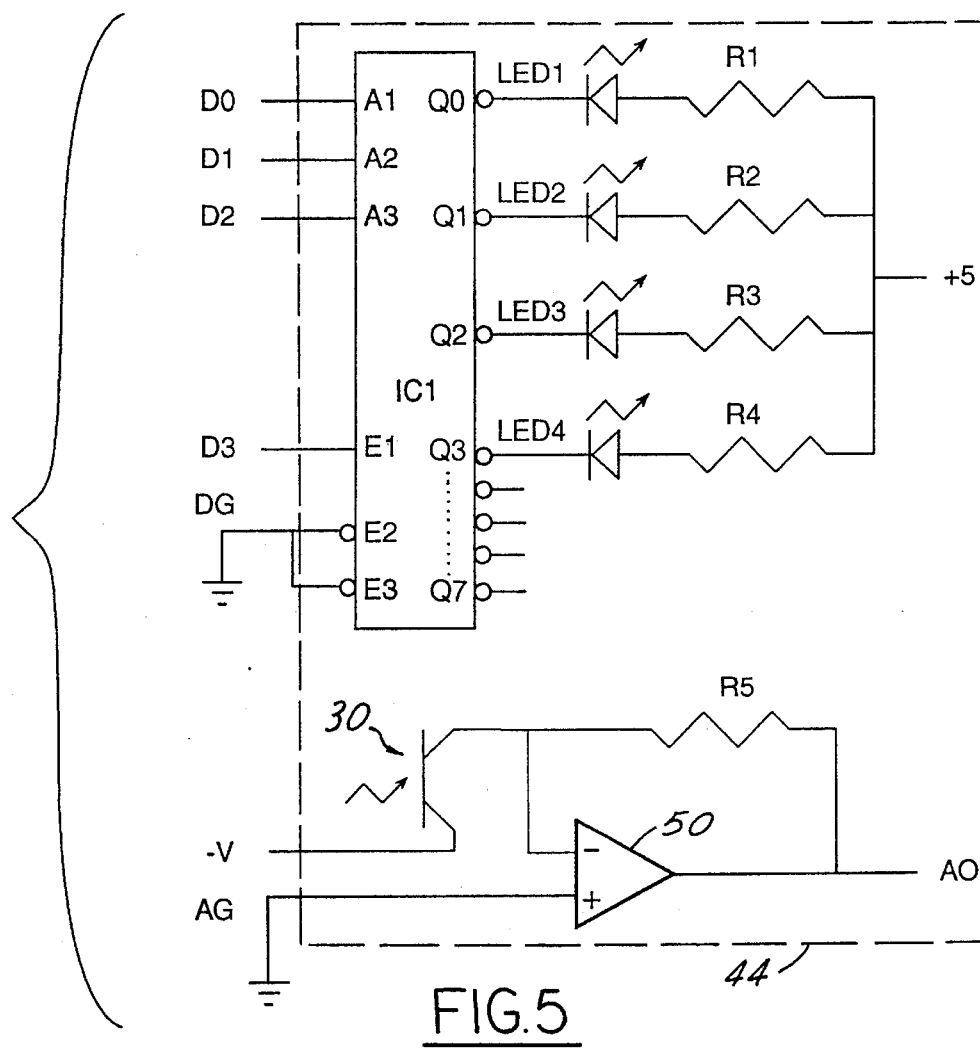
FIG. 5 is an electrical circuit schematic of the color sensor utilized in the present invention.

FIG. 4 shows a cross-section of a color sensor, such as color sensor 10 of FIG. 3. The various components are supported by a mounting block 40. A hemispherical cavity 42 is cut into the mounting block 40. The LEDs 32 and photosensor 30 are electrically connected to a printed circuit board (PCB) 44. The PCB 44 contains appropriate electrical and electronic circuitry. Preferably, the circuitry is arranged as illustrated in FIG. 5. PCB 44 is connected to the control logic 14 by electrical cable 16.

Referring now to FIG. 5, the control logic sends digital output signals D0, D1, D2, and D3 to PCB 44 through cable 16 to digital inputs A1–A3, and E1, respectively, of LED driver circuit IC1. The preferred LED driver is a Texas Instruments 74ACT138, which has sufficient current capacity for LEDs without requiring additional amplifier or buffer circuitry, and which also has decoder circuitry so that a large number of LEDs can be controlled using a smaller number of signal wires. Inputs E2 and E3 are connected to ground through signal wire DG. Signal D3 then enables the IC1 decoder causing one of its output signals, Q0–Q7 to go low according to the inputs on A1–A3 provided by D0 to D2. If output Q0 goes low, then current will flow through resistor R1 and light-emitting diode LED1 causing the LED to emit light. Resistor R1 is chosen to limit the current to an appropriate value which will not damage the LED or the LED driver.

Light emitted from an energized LED, such as LED1, propagates through optic window 34 and impinges upon an object of interest to the user, i.e. the skin of the user in the case of cosmetic color matching, or a wearable such as a scarf in the case of accessory color matching. The light is then scattered with at least a portion being reflected back through optic window 34 to photosensor 30 to provide an indication of the color of the object of interest and an appropriate match in the system database as explained in greater detail below.

In a similar fashion, light-emitting diodes LED2, LED3, and LED4 can all be similarly energized by the control logic which enables input D3 and an appropriate combination of inputs D0 and D1.

Light striking the photosensor 30 provides a signal to the negative input of operational amplifier 50. Resistor R5 provides a negative feedback path from output A0 to the negative input of operational amplifier 50. The output A0 of the operational amplifier 50 is the Analog Output of the color sensor. A good quality operational amplifier with a high input impedance, low noise, low offset, and low drift such as the Linear Technologies LT1055 operational amplifier is preferred. Of course, this operational amplifier also requires positive and negative power supply voltages which are not shown to simplify the schematic. The positive input of operational amplifier 50 is connected to ground.

Electrical cable 16 carries the +5 volt power, positive and negative supply voltages required by the operational amplifier, and LED control signals D0–D3 to the sensor. Electrical cable 16 also carries analog output signal A0 from the operational amplifier to the control logic.

Preferably, the light-emitting diodes 32 are chosen to have different nominal wavelengths, such as red, yellow, green, and blue. Also preferably, each LED 32 emits light at about 45° to the window 34 of the sensor 10 which impinges upon the customer's skin. Light scattered by diffuse reflection is detected by photosensor 30 in FIG. 4. The control logic is programmed to turn each LED 32 on in sequence and to measure the response of the photosensor 30 as an indication of the diffuse reflectivity of the skin for that particular wavelength of light.

The voltage output from the operational amplifier 50 will be approximately proportional to the amount of light striking the photosensor 30. The amount of light striking the photosensor is a measure of the diffuse reflectivity of the skin at the nominal wavelength of the emitting LED. Measuring diffuse reflectivity is preferred for cosmetics as it avoids the shiny, specular reflectance of oily skin which is considered to have an undesirable appearance.

Figure 6:
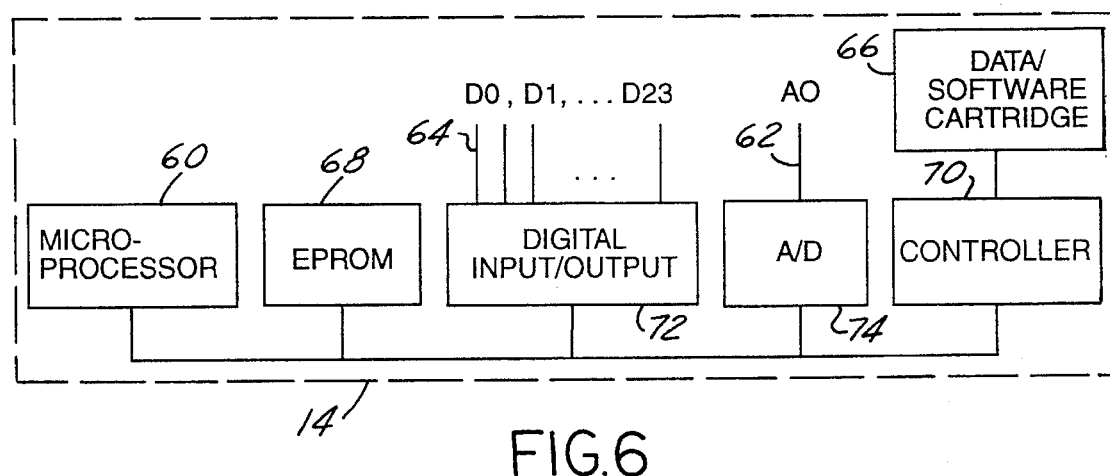
FIG. 6 is a block diagram of the computer utilized in the present invention.

Referring now to FIG. 6, in a preferred embodiment, the control logic includes a computer having an embedded microprocessor 60 with an analog input 62, digital inputs and outputs 64, and provision for an interchangeable data and software cartridge 66 such as the Kila Systems KS-2 processor. Preferably, the microprocessor 60 is an NEC V-40 processor, similar to the INTEL 8088®. The EPROM memory 68 provides for fixed program storage used to start processor operations. The data and software cartridge 66 and the controller 70 provide for interchangeable software and data to accommodate changes in the line of wearables or software algorithms. Data and software cartridge 66 may be implemented with one or more EPROMs, with a PCMIA cartridge, or the like.

The KS-2 processor has 24 digital input/output (I/O) lines labeled D0–D23 controlled by a digital I/O controller 72. The digital I/O lines 64 can be configured by software control either as input to the computer or as output from the computer according to the needs of the system. The digital I/O lines 64 are configured as outputs when used to control lights in the sensor 10 or on the output device 12 and as inputs when used to input an auxiliary value, such as a switch setting, into the computer. The analog-to-digital (A/D) converter 74 converts the analog output voltage of the sensor 10 into a digital value suitable for processing by microprocessor 60. The computer 14 may be programmed from an external computer via a standard communication link. Preferably, the external computer is an IBM-PC® programmed using a high-level source code, such as BASIC, C, or an assembly code. The source code is then compiled to produce machine code instructions which are stored in the data and software cartridge 66 along with the wearables database.

Figure 7:
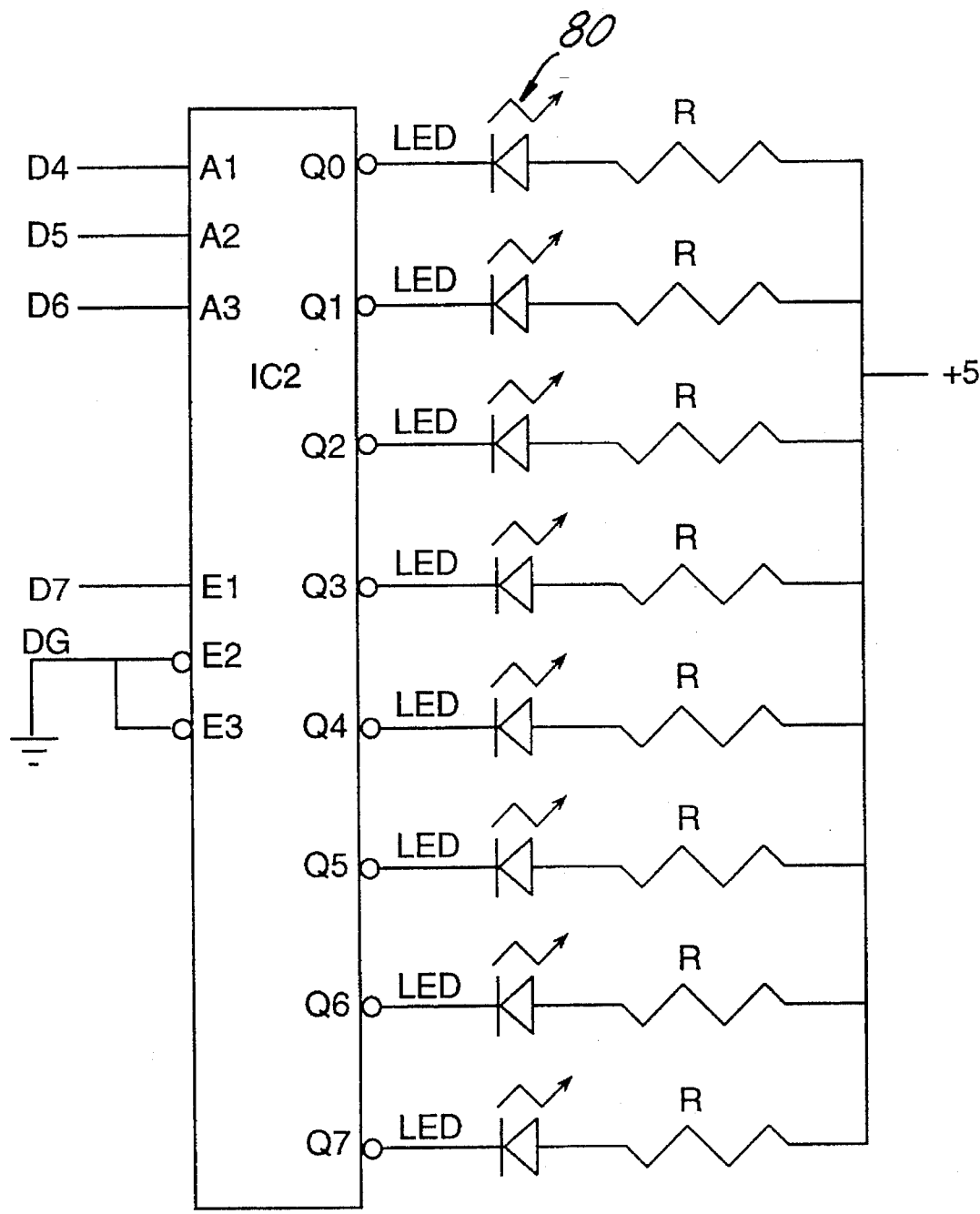
FIG. 7 is an electrical circuit schematic of an output device utilized in the present invention.

Referring now to FIG. 7, the control logic controls the display with its digital I/O lines. These lines are connected to display driver IC2 and LEDs 80. As with IC1, IC2 is preferably a 74ACT138 which may be used to control a plurality of LEDs 80. Digital I/O lines D4, D5 and D6 select an address of the decoder circuit which is enabled by D7. When D7 is activated, one of the outputs Q0–Q7 is selected according to the state of digital I/O lines D4–D6. The selected output goes low causing current to flow in the connected LED and corresponding current limiting resistor R. While the preferred display uses 8 LED outputs driven by a 74ACT138, it will be appreciated by those familiar with the art that the preferred circuit is but an illustration of the many possible alternative drive circuits and light displays. For example, outputs Q0–Q7 could alternatively be connected to solenoids for opening doors 20 of output device 12 (best illustrated in FIG. 2). Similarly, a number of output decoders, such as IC2, may be utilized to control a larger number of lights, doors, or LEDs than specifically illustrated.

Having described the electrical configuration of the device, the operation of the control logic will now be described.

When the control logic starts, it can activate all of the lights in the sensor head and on the display in an attractive sequence. This light show tests that all of the lights are working, alerts the user that the machine is turned on and ready for use, and may even attract other potential customers who might see the light show to the machine.

During operation, the control logic monitors the output of the photosensor by reading the value encoded by the analog-to-digital converter. Normally, the photosensor will detect the relatively bright ambient light. When the color sensor is pressed against the customer's skin, the light intensity detected by the photosensor will decrease significantly. Upon observing that the photosensor reading is less than a predetermined threshold value, the control logic can determine that the sensor is now in place and ready for a measurement.

To measure the color of an object of interest to a customer, the control logic turns on each of the LEDs in the color sensor head individually and records the resulting photosensor reading. The control logic then computes a metric and compares the metric of the object reflectivity with previously measured and stored reflectivity's for the wearables on display. The wearables may include cosmetics, such as foundation, lipstick, hair colorant, blush, eyeliner, or the like. In addition, wearables may include various clothing accessories such as shoes, purses, belts or ear-rings chosen to match the color measured from a dress, skirt, blouse, or other item of interest. Thus, the object of interest may be the skin of the customer or any other wearables desired to be color matched.

The metric used by the present invention to determine an appropriate wearable measures the difference in color between an object of interest and a wearable in a database. Small values of the metric indicate a close color match whereas large values indicate a poor match. The metric characterizes the color distance from an object of interest to each available wearable. As described above, the object may be skin and the wearable a cosmetic, or the object may be an article of clothing and the wearable another article of clothing. In general, the object may any object whose color is measured and the wearable any of a selection from which to find the best color match. The best match wearable is the selection characterized by the smallest value of the metric.

The color sensor is calibrated by measuring samples approximating zero reflectivity and complete (100%) reflectivity. The sample with nearly zero reflectivity is designated as black while the sample with nearly complete reflectivity is designated as white. The measurements described below thus provide black and white calibration values for use in computing the reflectivity of a particular sample. In a preferred embodiment, the measurements are represented by analog-to-digital converter (ADC) counts with the analog input to the ADC being the analog output voltage of the operational amplifier (A0) while the sensor head is held against the black and white samples. However, any other suitable representation is within the scope of the present invention.

A black and white calibration value is determined for each LED in the sensor. The black and white calibration values are determined as follows:

$W_k$=white ADC measurement with LED k turned on and any other LEDs turned off; and $B_k$=black ADC measurement with LED k turned on and any other LEDs turned off;

where k=an index of sensor LEDs with k=1 for red, 2 for yellow, etc. in a preferred embodiment. In general, k ranges from 1 to n where n is the number of LEDs in the sensor. Typically, the value for $B_k$ will be near zero, but may be non-zero due to light transmission within the sensor block, partial reflection from the optic window, spurious reflection from other objects, or due to offsets in the amplifier and the A/D electronics. To achieve maximum accuracy and resolution of the measurements, the LED drive currents and operational amplifier gains should be adjusted so that the $W_k$ readings are nearly full scale on the ADC. It is desirable that white samples not overload the ADC since this would limit the ability of the device to measure highly reflective surfaces.

Once black and white calibration values are determined for each LED, the reflectivity can be determined for any sample as characterized by:

$$\rho_k = 100 * \frac{ADC_k - B_k}{W_k - B_k}$$

where $\rho_k$=reflectivity at the wavelength of LED k, $ADC_k$=the A/D converter reading when $LED_k$ is turned on and any other LEDs are turned off, $W_k$=white calibration value, and $B_k$=black calibration value.

A database of reflectivities for available wearables can then be assembled and stored using measurements of the reflectivities of samples wearables. For example, let:

N=number of available wearables, and i=index of wearables where i=1, 2, . . . N, then $$R_k(i) = 100 * \frac{ADC_k - B_k}{W_k - B_k}$$

where $ADC_k$ is the A/D converter reading while the sensor is held against sample i while $LED_k$ is turned on and any other LEDs are turned off.

Table II shows a sample database with reflectivities for 14 typical cosmetic foundation colors.

TABLE II

| | | | | |
|---|---|---|---|---|
| Black | 24 | 29 | 27 | 31 |
| White | 1221 | 1197 | 1073 | 1312 |
| Rich Mahogany | 9.1 | 7.3 | 4.6 | 0.8 |
| Rich Copper | 17.2 | 14.5 | 10.0 | 3.7 |
| Spiced Amber | 26.6 | 22.9 | 17.3 | 7.3 |
| Copper Tan | 28.0 | 23.0 | 16.7 | 7.9 |
| Rich Amber | 30.0 | 26.4 | 20.3 | 9.0 |
| Toasted Tan | 31.4 | 27.0 | 21.1 | 11.3 |
| Honey Beige | 34.0 | 30.1 | 23.9 | 13.5 |
| True Beige | 37.0 | 33.5 | 28.0 | 18.3 |
| Rosetint Beige | 39.4 | 35.6 | 29.2 | 17.8 |
| Warmest Beige | 42.8 | 39.4 | 33.1 | 20.3 |
| Porcelain Beige | 49.0 | 46.0 | 39.5 | 24.6 |
| Ivory Beige | 56.8 | 53.0 | 45.3 | 30.7 |

The first two entries in the table correspond to black and white calibration values with each number in a row corresponding to the reflectivity of the sample for one of the four LEDs (in a preferred embodiment). Thus, a different number of LEDs would result in a database having a different number of entries in each row. Likewise, the database could have a larger or smaller number of rows corresponding to the number of available wearables. In a preferred embodiment, each wearable is characterized by a name and reflectivities associated with each of the LEDs in the sensor as depicted in Table II.

The values contained in Table II could be stored in one or more EPROMs, a software/data cartridge such as a PCMIA cartridge, battery-backed RAM, disk, or other non-volatile storage media available to the processor and control logic.

When an object is pressed against the optic window of the sensor head and the measurement process is initiated, each LED is turned on in sequence and the resulting $ADC_k$ is determined. A corresponding reflectivity is calculated according to:

$$r_k = 100 * \frac{ADC_k - Bk}{W_k - B_k}$$

where $r_k$=the reflectivity of the object at the wavelength of $LED_k$; and $ADC_k$=the A/D converter counts read when the object is held against the sensor head, $LED_k$ is turned on, and any other LEDs are turned off.

Once the reflectivity of the object at each LED wavelength has been determined, the color distance between the object and each wearable in the database is determined using a generalized metric:

$$\begin{aligned} D(i) = & \; C_1 * [r_1 - R_1(i)]^2 + \\ & \; C_2 * [r_2 - R_2(i)]^2 + \\ & \; \vdots \\ & + C_n * [r_n - R_n(i)]^2 \end{aligned}$$

where n represents the number of LEDs in the sensor, $C_k$ represents a weighting factor for $LED_k$ (e.g. 10, 20, 20, 10 for red, yellow, green, and blue LEDs, respectively), $R_k(i)$ represents the reflectivity of wearable i to the wavelength of $LED_k$, $r_k$ represents the reflectivity of the object at the wavelength of $LED_k$, and $D_i$ represents the distance in color space between the object of interest and wearable i.

The metric $D_i$ is determined for each wearable i where i=1, 2, . . . N. The wearable i with the smallest value of $D_i$ indicates the best available match to the object of interest. Ad-hoc adjustments of this best match to a lighter or darker value can be performed according to the recommendations of the company selling the wearables or based upon an auxiliary input indicating a customer's preference for a lighter or darker color.

After determining the wearable with the best match, the control logic turns on the appropriate display light. As a part of the measurement cycle, it may be desirable to turn on the display lights in an attractive sequence before indicating the selected cosmetic to confirm to the customer that the machine is working and to attract the interest of other potential customers.

Figure 8:
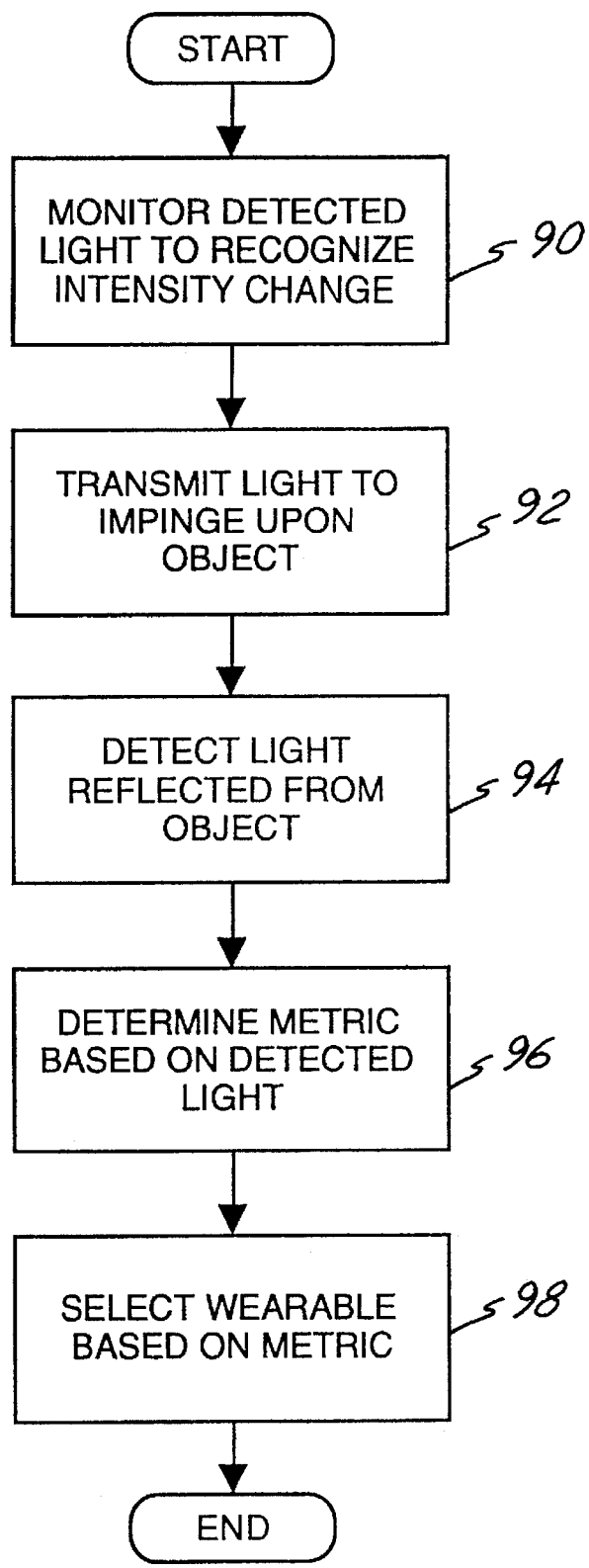
FIG. 8 is a flow chart of the method of the present invention.

Referring now to FIG. 8, a flow chart is shown illustrating the method of the present invention for selecting a wearable based on an object of interest. It should be recognized that the flowchart of FIG. 8 depicts sequential processing of the method steps although any of a number of processing strategies could be utilized without departing from the spirit or scope of the present invention. For example, if the control logic is implemented in hardware, many of the method steps may be performed simultaneously or nearly simultaneously. Similarly, an interrupt driven processing strategy could also be utilized to achieve the objects and advantages of the present invention.

As depicted by block 90 of FIG. 8, the control logic monitors the light detected from sensor 10 even though LEDs 32 are not energized. Thus, sensor 10 is utilized to detect a significant change in ambient light intensity to trigger a measurement cycle. For example, when a customer places sensor 10 against an object such as a scarf, a shirt, or skin, the detected light intensity will decrease significantly. Once this decrease is detected, the control logic automatically begins a measurement cycle. Thus, in a preferred embodiment, the control logic detects a reduction in light intensity to indicate that a user has covered the sensor head and is ready for a reading since covering the sensor head reduces ambient light resulting in the reduced intensity reading. As illustrated by block 92, the method includes the step of transmitting light to impinge upon the object of interest to be color matched with a wearable. In a preferred embodiment utilizing four (4) LEDs to transmit different nominal wavelengths of light, each LED is energized in sequence for a period of time long enough for the photosensor to get an intensity reading of the reflected light as depicted by block 94.

At block 94, the method detects the light reflected from the object of interest and assigns a value corresponding to the intensity of the light or another suitable characteristic indicative of the reflectivity of the object of interest. Thus, in a preferred embodiment, the method includes repeatedly performing the operations indicated by blocks 92 and 94 until each of the LEDs has been energized at least once (an LED-by-LED average could easily be taken over a number of readings if desired). Alternatively, if a broadband or white light source is utilized, the light is transmitted and detected only once as specifically illustrated in FIG. 8. However, as described above, this implementation requires a number of detectors each sensitive to a different nominal wavelength or employing corresponding filters in front of each such detector.

With continuing reference to FIG. 8, at block 96, the method of the present invention determines the distance, in color space, from the object of interest to each available wearable in a database based on the reflected light detected by one or more photosensors as described in detail above. At block 98, the corresponding wearable is selected based on the smallest value for the computed metric. This step may include energizing a spotlight which shines on the selected product, lighting an LED or incandescent lamp next to the product, opening a door in a mechanical device, such as the device illustrated in FIG. 2, or operating some other indicator of the selected product.

Having described the preferred embodiment of the device, it will be appreciated by those familiar with the art of optical design, color science, and electrical design that alternative designs can be readily created which embody the methods of color matching taught herein.

Specifically, the preferred color sensor uses color LEDs and a photosensor but it could have been made in other configurations. The use of four (4) LEDs in red, yellow, green, and blue colors is illustrative, but more or less LEDs of various colors could also be used. Or, a white light (broadband) source and a plurality of photosensors, each photosensor being sensitive to a particular band of wavelengths could be employed. Alternatively, a single light source and a single photosensor could be employed. Such an instrument would be sensitive to reflectivity only, not to color per se. Filters could be selected to measure reflectivity in desired wavelength bands. A single channel instrument constructed in this manner would be useful to match cosmetics to skin if the cosmetics were prepared in shades of intensity and without variation in hue. Spectro-photometers made with diffraction gratings or prisms as dispersive elements and a scanning sensor or linear sensor arrays as detectors can also be utilized to measure color. Or a colorimeter can be formed with a dispersive element, one or more detector elements, and plurality of masks where the masks select or weight different parts of the spectrum for measurement by the detector.

The preferred software uses a weighted difference square formula to match colors. Alternatively, the CIE color matching and other formulas may be utilized. Similarly, the preferred embodiment utilizes a computer having control logic to effect system operation. Of course, the system and method of the present invention may be effected with control logic implemented utilizing application-specific integrated circuits (ASICs), reduced instruction set controllers (RISCs), programmable logic arrays (PLAs), discrete components, or the like.

The preferred display uses one LED driven by a decoder for each cosmetic color. Other circuitry could be used to drive other lights or other methods of indicating the selected cosmetic may be implemented. For example, the mechanical device which opens a door and exposes the selected cosmetic as illustrated in FIG. 2 may be provided without departing from the spirit or scope of the present invention.

Finally, as indicated throughout the above description and in the following claims, the described device is not limited to matching foundation color to skin color. It could be used to match lipstick and eyeshadow to clothing colors. It could also be used to match accessories, such as earrings, belts, shoes, and purses, to clothing colors. Or, it could be used to match the foundation color of a competing cosmetic manufacturer.

While the best mode for carrying out the invention has been described in detail, those familiar with the art to which this invention relates will recognize various alternative designs and embodiments for practicing the invention as defined by the following claims.

What is claimed is:

1. An apparatus for selecting a wearable, the apparatus comprising:

an input device having a light emitting portion light receiving portion, the light emitting portion operative to emit light which is reflected by an object, and the light receiving portion operative to detect the reflected light, thereby producing a sensed electrical signal representative of the color of the object based on light reflectivity of the object;

a memory for storing a database of color reflectivities associated with a plurality of wearables, each wearable having at least one reflectivity identified therewith;

control logic in communication with the input device, the control logic being operative to receive said sensed signal to compare the reflectivity of the sensed object with the color reflectivities of the wearables, to determine a difference metric between the color reflectivities of each of the wearables and the reflectivity of the object, and to compare the difference metrics to determine the least difference metric to select one of the plurality of wearables based on the least difference metric; and an output device in communication with the control logic for indicating the selected wearable associated with the least difference metric.

2. The apparatus of claim 1 wherein the control logic comprises a microprocessor.

3. The apparatus of claim 1 wherein the control logic comprises an integrated circuit.

4. The apparatus of claim 1 wherein the light emitting portion of the input device comprises a plurality of light emitting sources, each of the plurality of light emitting sources characterized by a different nominal wavelength.

5. The apparatus of claim 1 wherein the light receiving portion of the input device comprises a photosensor for detecting the reflected light.

6. The apparatus of claim 1 wherein the output device comprises a plurality of light-emitting elements each corresponding to one of the plurality of wearables.

7. The apparatus of claim 6 wherein the plurality of light-emitting elements comprises a corresponding plurality of light-emitting diodes.

8. The apparatus of claim 1 wherein the output device comprises mechanical means for indicating the selected wearable.

9. The apparatus of claim 8 wherein the mechanical means comprises a door which opens to reveal the selected wearable.

10. The apparatus of claim 8 wherein the mechanical means automatically dispenses a sample of the selected wearable.

11. The apparatus of claim 1 wherein the control logic is further operative to automatically detect when the input device is in use and activate the selection of a wearable.

12. The apparatus of claim 1 wherein the control logic is further operative to automatically control the light emitting portion of the input device based on a change in intensity of the detected light.

13. The apparatus of claim 1 wherein the input device includes a housing:

the light emitting portion includes a white light source disposed within the housing; and the light receiving portion includes a plurality of light detectors disposed within the housing, each of the plurality receiving a different wavelength of the reflected light.

14. The apparatus of claim 13 wherein the light receiving portion includes a plurality of filters each being characterized by a different nominal wavelength and being disposed within the housing adjacent to a corresponding one of the plurality of light detectors.

15. The apparatus of claim 1 wherein the object is a person's skin.

16. The apparatus of claim 1 wherein the wearable is a cosmetic.

17. The apparatus of claim 1 wherein the wearable is selected from the group consisting of eyebrow pencils, eyeliner, mascara, blush, highlight, rouge, coverup, face powder, lipstick, lip liner, warpaint, foundation, eyeshadow, and hair colorants.

18. The apparatus of claim 1 wherein the wearable is a clothing accessory.

19. The apparatus of claim 1 wherein the input device includes a plurality of light sources and wherein the control logic is further operative to determine a plurality of reflectivities of the sensed object based upon the detected reflected light originating from each of the plurality of light sources.

20. The apparatus of claim 19 wherein the control logic is further operative to select a wearable based on the plurality of reflectivities and the distance metric calculated from comparison to the color reflectivities.

21. The apparatus of claim 1 wherein the output device comprises a liquid crystal display.

22. The apparatus of claim 1 wherein the control logic is further operative to activate the output device so as to attract potential customers.

23. The apparatus of claim 1 wherein the control logic comprises a removable cartridge so as to facilitate updating of the control logic and the data.

24. The apparatus of claim 1 wherein the database is a foundation makeup database.

25. A method for selecting a wearable, the method comprising:

storing a plurality of reflectivity values associated with wearables in a database;

transmitting light to impinge upon an object to be coordinated with the wearable;

detecting light reflected from the object to provide an object reflectivity value representing color of the object;

comparing the object reflectivity value to each of the plurality of reflectivity values of the wearables to determine metrics based on the relationships between the object reflectivity value and the reflectivity values of the wearables the metric representing closeness in match of color based on the reflectivities; and selecting the wearable based on the metrics.

26. A method of selecting one of a plurality of wearables based on the color of a sensed object, the method including the steps of:

storing a plurality of color reflectivities and associated wearables in a database;

sensing reflectivity of an object by emitting light toward the object and receiving reflected light from the object and producing an electrical signal representative of sensed color based on reflectivity of the object;

comparing the sensed color with each of the stored color reflectivities and determining a color difference metric for each wearable;

comparing the difference metrics to determine the least difference value and identifying the wearable associated with the least difference value; and visually indicating the selected wearable.

27. The method of claim 26 wherein the database represents material selected from the group consisting of lipstick, eyeshadow, hair colorants, and other cosmetics.

28. A method set forth in claim 26 further including sensing a plurality of color reflectivities associated with a plurality of wearables by light reflection and producing an electrical signal indicative of the color reflectivities.

29. A method of automatically selecting one of a plurality of wearables based on the color of a sensed object, the method including the steps of:

providing an input device that senses color of an object by emitting light toward the object by a light source and receiving light reflected from the object from the light source by a photosensor and providing a electrical signal representative of the reflected light;

storing a plurality of color reflectivities and associated wearables in a database;

comparing the electrical signal to a light threshold value to determine the presence of a predetermined relationship indicative of placement of an object to be measured against the input device;

comparing the sensed color of the electrical signal with the database of wearables and selecting one of the plurality of wearables only after detecting the predetermined relationship; and indicating the selected wearable.

30. A method as set forth in claim 29 further including determining color difference metrics between each of the stored color reflectivities and the sensed color of the object.

31. A method as set forth in claim 30 further including comparing the difference metrics to determine the least difference value and identifying the wearable associated with the least difference value.

32. A method of automatically selecting one of a plurality of wearables based on the color of a sensed object, the method including the steps of:

providing an input device that senses color of an object by emitting light toward the object by a light source and receiving light reflected from the object from the light source by a photosensor and providing an electrical signal representative of the reflected light;

storing a plurality of color reflectivities and associated wearables in a database;

receiving the electrical signal representative of object's color and comparing the sensed object's color with the stored color reflectivities and selecting one of the plurality of wearables based on the comparison; and visually indicating the selected wearable by activation of means directly adjacent the selected wearable.

33. A method as set forth in claim 32 further including determining color difference metrics between each of the stored color reflectivities and the object's color.

34. A method as set forth in claim 33 further including comparing the difference metrics to determine the least difference value and identifying the wearable associated with the least difference value.

* * * * *